US011480379B2

United States Patent
Büttiker

(10) Patent No.: US 11,480,379 B2
(45) Date of Patent: Oct. 25, 2022

(54) THERMAL PROTECTION STORAGE CELL FOR A COLD TRANSPORT BOX

(71) Applicant: SWISSMEDPACK TECHNOLOGIEN JP.BUETTIKER GMBH, Basel (CH)

(72) Inventor: Jean-Pierre Büttiker, Witterswil (CH)

(73) Assignee: SWISSMEDPACK TECHNOLOGIEN JP. BUETTIKER GMBH, Basel (CH)

( * ) Notice: Subject to any disclaimer, the term of this patent is extended or adjusted under 35 U.S.C. 154(b) by 401 days.

(21) Appl. No.: 15/762,205

(22) PCT Filed: Sep. 27, 2016

(86) PCT No.: PCT/EP2016/072995
§ 371 (c)(1),
(2) Date: Mar. 22, 2018

(87) PCT Pub. No.: WO2017/055280
PCT Pub. Date: Apr. 6, 2017

(65) Prior Publication Data
US 2018/0283761 A1   Oct. 4, 2018

(30) Foreign Application Priority Data

Sep. 28, 2015 (EP) .................... 15187043

(51) Int. Cl.
*F25D 3/08* (2006.01)
*A01N 1/02* (2006.01)
*B65D 81/38* (2006.01)

(52) U.S. Cl.
CPC ............. *F25D 3/08* (2013.01); *A01N 1/0273* (2013.01); *B65D 81/38* (2013.01); *B65D 81/382* (2013.01);
(Continued)

(58) Field of Classification Search
CPC .. A01N 1/0273; B65D 81/3823; B65D 81/38; B65D 81/382; F25D 3/08; F25D 2303/085; F25D 2331/804; F25D 3/00; F25D 3/105
See application file for complete search history.

(56) References Cited

U.S. PATENT DOCUMENTS 5,984,953 A    11/1999  Sabin
2007/0186577 A1  8/2007  Goncharko
(Continued)

FOREIGN PATENT DOCUMENTS

EP    2146162 A1    1/2010
FR    2851034 A1 *  8/2004    ............... F25D 3/08
(Continued)

OTHER PUBLICATIONS

English translation of JP-2001330351-A (Year: 2001).*
(Continued)

*Primary Examiner* — Henry T Crenshaw
(74) *Attorney, Agent, or Firm* — Kratz, Quintos & Hanson, LLP

(57) ABSTRACT

A thermo-protection-storage-cell (1) for the ensuring of a temperature range from a lower temperature exposure limit to an upper temperature exposure limit contains a thermo-cell body (2) and at least one filling chamber (3) which is arranged in the thermo-cell body (2). The at least one filling chamber (3) is filled with a first phase-change material (4) which changes its phase at the point of the lower temperature exposure limit. The at least one filling chamber (3) is filled with a second phase-change material (5) which changes its phase at the point of the upper temperature exposure limit. The thermo-protection-storage-cell (1) facilitates an efficient and safe ensuring of a temperature-sensitive good in a useful way, especially during its transport.

6 Claims, 3 Drawing Sheets

(52) U.S. Cl.
CPC .... *B65D 81/3823* (2013.01); *F25D 2303/085* (2013.01); *F25D 2331/804* (2013.01)

(56) References Cited

U.S. PATENT DOCUMENTS

| | | | | |
|---|---|---|---|---|
| 2012/0305435 | A1* | 12/2012 | Matta | B65D 81/3862 206/521 |
| 2014/0021208 | A1* | 1/2014 | Anti | A01N 1/0273 220/592.25 |
| 2014/0311170 | A1 | 10/2014 | Mills | |
| 2014/0353317 | A1* | 12/2014 | Ranade | B65D 81/3823 220/592.01 |
| 2015/0239640 | A1* | 8/2015 | Smith | A01N 1/0273 220/592.2 |

FOREIGN PATENT DOCUMENTS

| | | | |
|---|---|---|---|
| JP | 2001-330351 | A | 11/2001 |
| JP | 2001330351 | A * | 11/2001 |
| KR | 10-1435025 | B1 | 8/2014 |
| WO | 2010/132726 | A1 | 11/2010 |
| WO | 2013002324 | A1 | 1/2013 |

OTHER PUBLICATIONS

Written Opinion of the International Searching Authority for International Application No. PCT/EP2016/072995 dated Dec. 6, 2016 (6 Sheets).

International Search Report for International Application No. PCT/EP2016/072995 dated Dec. 6, 2016 (6 Sheets).

Office Action pursuant to Article 94(3) EPC of European Patent Application No. 16775188.2 dated Jan. 23, 2020.

* cited by examiner

THERMAL PROTECTION STORAGE CELL FOR A COLD TRANSPORT BOX

TECHNICAL AREA

The invention concerns a thereto-protection-storage-cell (short: thermo-cell) analogous to the generic term of an embodiment as well as a transport-box with this kind of thermo-protection-storage-cell and the use of it.

Thermo-cells with a thermo-cell body and at least one filling chamber which is positioned in the thermo-cell body, can be used for the ensuring of a temperature range from a lower temperature exposure limit to an upper temperature exposure limit.

STATE OF THE ART

For the ensuring of goods in a temperature range which is preferred or even needed for it, different kinds of equipment are used nowadays. Among other things, there is the possibility of using cold boxes or rather cold transport-boxes to transport goods. Often it is enormously important that the demanded temperature range is guaranteed during the whole transport when transporting pharmaceuticals and particularly biopharmaceuticals. If the temperature range cannot be ensured, these pharmaceuticals may not be used.

Figure 3:
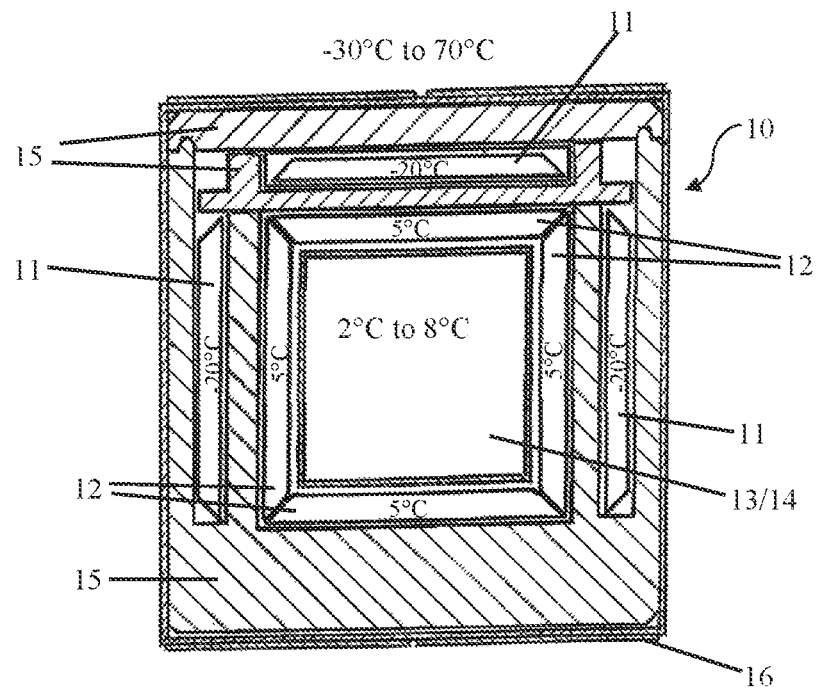
Figure 4:
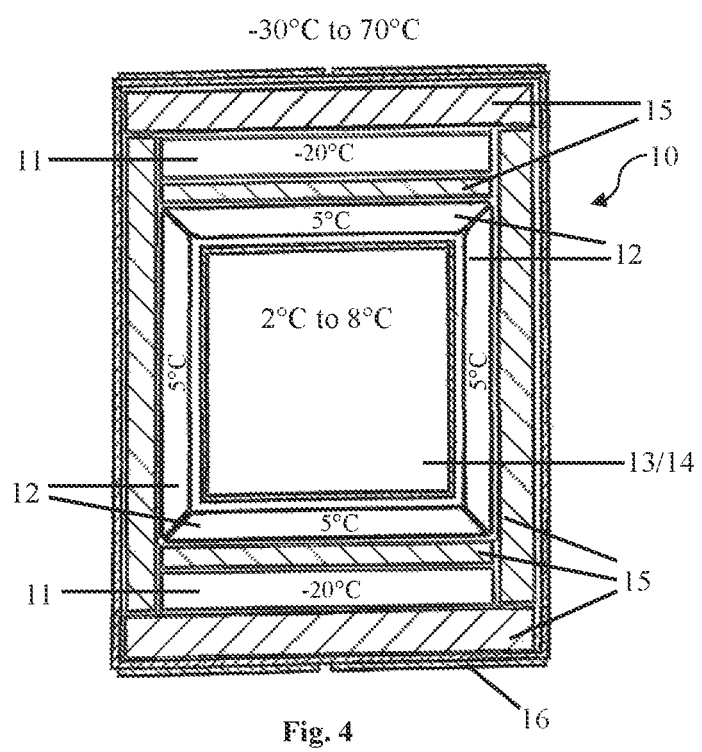
Figure 5:
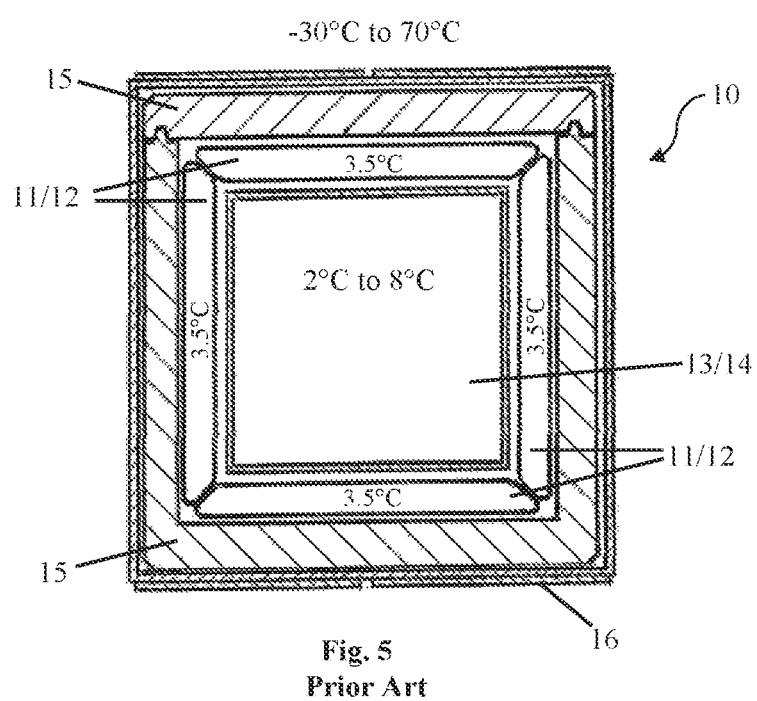

Examples of known cold transport-boxes 10 are shown in FIGS. 3, 4 and 5. These cold transport-boxes 10 are basically constructed similarly to each other. Usually they comprise a set of warmth-11 and cold energy storage cells 12 as simple constructions of thermo-cells which wrap up the good 13 inside the internal space 14 such as biopharmaceuticals or classical pharmaceuticals or groceries. The wrapped-up internal space 14 is used to ensure that the temperature of the good is e.g. from 2 to 8 degrees Celsius. Other layers are an insulation 15 placed outside the warmth-and cold energy storage cell 11, 12 an outer corrugated cardboard-box 16. If the entire weight exceeds the weight of 30 kg, a wooden pallet is used as a stabilization and simplification of the handling.

These solution approaches are known in the state of art: One is the possibility of separated warmth- and cold energy storage cell 11, 12 shown in FIGS. 3 and 4 and the second is a warmth-cold-combination-cell shown 11/12 in FIG. 5.

The first solution is to fill up the warmth energy storage cell which must be pre-conditioned in a cold storage room with 5 degrees Celsius either with paraffin or with water. The cold energy storage cell which is filled with water is pre-conditioned in the freezer to −20 degrees Celsius respectively −10 degrees Celsius.

The second solution is to fill up the warmth-cold-combination-cell which has to be pre-conditioned in a high-precision cold storage room with 3.5 degrees Celsius to ±0.5 degrees Celsius with paraffin.

The separated warmth- and cold energy storage cells in the first solution have a high difference in temperature which can lead to a cannibalization of the thermal-performance of transport-box. If e.g. a cold transport-box is left behind at an airport cargo terminal or a customs clearance for several days, the pharmaceuticals freeze and cannot be administered to patients.

The disadvantage of the second solution is the division of the thermal performance into cooling and heating. Another disadvantage of this solution is the costly, precise pre-conditioning as well as the paraffin variation of composition.

Both of the described solutions of the state of the art comprise typically the ecological and the economical weak point that the different used cold transport-boxes as well as the thermos-cells are not reusable and need to be disposed after using.

The purpose of the new invention is the efficient and secure ensuring of a temperature-sensitive good in a simple and useful way particularly during the transport in a certain temperature range.

DESCRIPTION OF THE INVENTION

According to the invention the task is solved with a thermo-cell which is defined through the characteristics of the embodiment as well as with a cold box. Advantageous execution varieties of invention are the result of the dependent claims.

The base of the invention consists of the following: A thermo-cell for the ensuring of the temperature range from a lower temperature exposure limit to a upper temperature exposure limit consists of a thermo-cell body and at least one filling chamber which is positioned in the thermo-cell body. The filling chamber is filled with a first phase-change material (short: pcm) which changes its phase at the lower point of temperature. The at least one filling chamber is filled in addition with a second phase-change material which changes its phase at the upper point of temperature.

The term "phase" in context with the pcm can refer as an aggregate phase of the pcm. The terms "phase" and "aggregate phase" can be used synonymous.

The term "ensuring" in the context with the invention can refer to a keeping in certain conditions during a certain period of time. These certain conditions contain the temperature at which a temperature-sensitive good should be kept. The ensuring can refer to a certain period of time in which a good should be kept in a certain range of temperature e.g. which is needed for transport.

The term "temperature-sensitive good" can refer to an object respectively a material which is damaged in composition or quality when kept outside its demanded temperature range. The quality can be damaged when kept outside its demanded temperature range during a certain period of time. The temperature-sensitive good can be e.g. a pharmaceutical and especially a biopharmaceutical.

The thermo-cell body can be made of e.g. a solid material like polyethylene or similar.

The at least one filling chamber can take the pcm safely. It should contain a tamper-evident safety seal which can guarantee the originality of the pcm. A manipulation of the pcm can therefore be prevented.

The invention uses a warmth-cold-combination cell which can be used in a cold transport-box respectively transport-box respectively cold-box. According to the invention's at least one filling chamber concurrent can be equipped with a warmth-cold protective function.

The lower temperature differs typically from the upper temperature. The upper temperature is higher than the lower temperature. Therefore, the temperature range can be established with subtracting the lower temperature from the upper temperature. Typical pcm can be aqueous saline solutions, water, salt-hydrates and paraffines which consists of alkanes.

The invention uses the comparatively high latent heat of fusion, heat of solution or heat of absorption whilst using the enthalpy of the pcm aggregate phase change for the protective purposes of the good. The use of the enthalpy with the phase transition between e.g. solid and liquid is reversible thermodynamic process with a high no-degradation after a large number of freeze/melt cycle. The enthalpy can be measured with differential scanning calorimetry in J/g shown in FIG. 2. If the storage temperature of the good is fixed to a certain range of temperature, the ensuring in the thermo-cell respectively a transport within must be in the same temperature range.

This is how the maximum and minimum barrier temperature respectively the upper and the lower temperature of the temperature range are set. The thermo-cell prevents the transgression of the temperature range. An active cooling respectively heating does not take place.

The thermo-cell possesses two independent protective functions: One for the protection of the minimum barrier temperature and one for the protection of the maximum barrier temperature.

For the protection of the minimum barrier temperature from the chillness side, an adequate quantity of the first pcm is placed at the borderline. If coldness respectively coldness energy approaches the thermo-cell, the coldness energy leads to a phase-change of the e.g. liquid pcm to a e.g. solid respectively crystalline phase.

For the protection of the maximum barrier temperature from heat, an adequate quantity of the second pcm is placed at the borderline. If warmness respectively warmness energy approaches the thermo-cell, the warmness energy leads to a phase-change of the e.g. solid respectively crystalline pcm to a e.g. liquid phase.

The invention offers advantages compared with the state of the art:

The temperature can be set efficiently to the needs of the goods in using different kinds of first and second pcm. For example, the temperature range can be set to a pharmaceutical scope of protection if the good is a pharmaceutical.

Furthermore the two different pcm in the at least one thermo-cell can protect the maximum and minimum barrier temperature exactly and without latent heat loss.

The thermo-cell can possess several times the protective performance respectively performance-weight ratio because the two pcm obtain a relatively high latent heat storage volume because no cannibalization of the thermal-performance takes place and so a heat loss can be prevented.

The relatively high protective performance of the thermo-cell can reduce the wall thickness of the coldtransport-box respectively cold box and therefore it leads to a potency factor three higher box-exploitation volume in comparison with conventional transport-boxes.

The danger of biopharmaceutical-freeze can be minimized respectively eliminated. This could be important if e.g. a cold transport-box is left behind at an airport cargo terminal or a customs clearance for several days because the other way around the thermo-cell can be charged or recharged at the lower or the upper temperature.

According to the invention the thermo-cell facilitates an efficient and safe ensuring of the temperature-sensitive good in the temperature range in a simple and useful way especially during its transport.

Preferably the first pcm changes between a solid and a liquid phase approximately at the lower temperature. The second pcm changes analogously between a solid and a liquid phase approximately at the upper temperature. This kind of pcm facilitate an efficient and precise implementation of the thermo-cell.

The lower temperature is preferably 2 degrees Celsius and the upper temperature is preferably 8 degrees Celsius. This kind of minimum and maximum barrier temperature defines a temperature range which is desired in various areas. E.g. the pharmaceuticals and especially the biopharmaceuticals should be kept in this range of temperature. Also groceries such as milk products, meat or vegetables need to be kept in this temperature range.

Alternatively, the lower temperature is approximately 15 degrees Celsius and the upper temperature is approximately 25 degrees Celsius. This kind of temperature limits facilitate to define a temperature range which cover the normal room temperature. This range of normal room temperature can be desired for e.g. the storage of various pharmaceuticals.

Alternatively, the upper temperature is in an area of approx. 15 to 25 degrees Celsius. An upper temperature can be desired in various areas as room temperature range.

Alternatively the lower temperature is approx. −25 degrees Celsius and the upper temperature is about −18 degrees Celsius. This kind of temperature limits facilitate the determination of frozen temperature range. This kind of temperature range can be desired in areas in which goods must be held as storage for a long period of time. E.g. it can be used for the freezing or storing of groceries.

Alternatively, the lower temperature is approx. −90 degrees Celsius and the upper temperature is −70 degrees Celsius. This kind of temperature limits facilitate the temperature range which is desired in pharmaceutical industry regularly.

Preferably the at least one filling chamber contain at least or exactly two filling chambers from which one of the at least two filling chambers contains the first pcm and the second of the at least two filling chambers contains the second pcm. With such a thermo-cell it is possible to choose the pcm independently from each other. It can be prevented that the two pcm must be blended and as a result eventually interact with each other. The two pcm can be chosen appropriately to their purpose of use without considering if they damage each other.

Another aspect of the invention concerns a transport-box for the transport of a temperature-sensitive good in a temperature range from a lower temperature to a upper temperature. The transport-box contains an internal space to take in the temperature-sensitive good and a cell wall which surrounds the internal space. At least one thermo-cell is arranged in the cell wall as it is described before.

The term "take in" can either mean to put, to lay or to place the good in the internal space of the thermo-cell. Therefore, the internal space must accessible as e.g. it must have the possibility to be opened. The good can now be put, laid or placed inside the internal space and then it can be closed again. The internal space is completely closable so that the good is fully surrounded by the cell wall.

This kind of described thermo-cells can be used in transport-boxes of any kind such as small transport-boxes for self-medication patients or courier transport-boxes or pallet-based transport-boxes in the size of air containers or shipment containers. The described effects and advantages of the thermo-cell can be efficiently implemented with this kind of transport-boxes. These effects and advantages can be achieved when the transport-boxes are highly used.

The thermo-cells of the transport-boxes, according to the invention, or the whole transport-boxes can be reused in various ways. They can be used e.g. as cold boxes for groceries after their use for a transport of pharmaceuticals. This can be advantageous and useful ecologically as well as economically.

The at least one thermo-cell in the transport-box should be covered by an insulation. The term "cover" can implement in this context that the thermo-cell is surround at least partly from the outside. E.g. the at least one thermo-cell can be surrounded by an insulation in this way.

The insulation can either be a loose material which is put tightly to the cell wall or it can consist from a solid material such as a panel or similar.

This kind of insulation can improve the efficiency of the transport-box. Especially the transfer of extreme variations in temperature outside the transport-box to the thermo-cell can be reduced.

Preferably the transport-box contains a protective covering which is arranged at the inside wall which borders the internal space. This kind of protective covering call facilitate a highly efficient, conserving and safe take in of the good. The protective covering can be made of e.g. corrugated cardboard in form of the inner box.

Another aspect of the invention concerns preferred uses of a transport-box in the described way.

According to the invention, the transport-box can be used for the transport of a pharmaceutical whereby the lower temperature is approx. 2 degrees Celsius and the upper temperature is approx. 8 degrees Celsius, the lower temperature is approx. 15 degrees Celsius and the upper temperature is approx, 25 degrees Celsius, the lower temperature is approx. −25 degrees Celsius and the upper temperature is approx. −18 degrees Celsius, the lower temperature is approx. −90 degrees Celsius and the upper temperature is approx. −70 degrees Celsius.

According to the invention the transport-box can be used for the transport of groceries whereby the lower temperature is approx. −25 degrees Celsius and the upper temperature is approx. −18 degrees Celsius or the lower temperature is approx. 2 degrees Celsius and the upper temperature is approx. 8 degrees Celsius.

According to the invention the transport-box can be used for the transport a human or an animal organ whereby the lower and the upper temperature must be adapted to the human or animal organ.

The invention is described in its favorite form of design, but many changes and variations can be made without crossing the extent of the invention. Therefore, it is foreseen that the enclosed claims cover changes and variations which are part of the extent of the invention.

SHORT DESCRIPTION OF THE DRAWINGS

Figure 1:
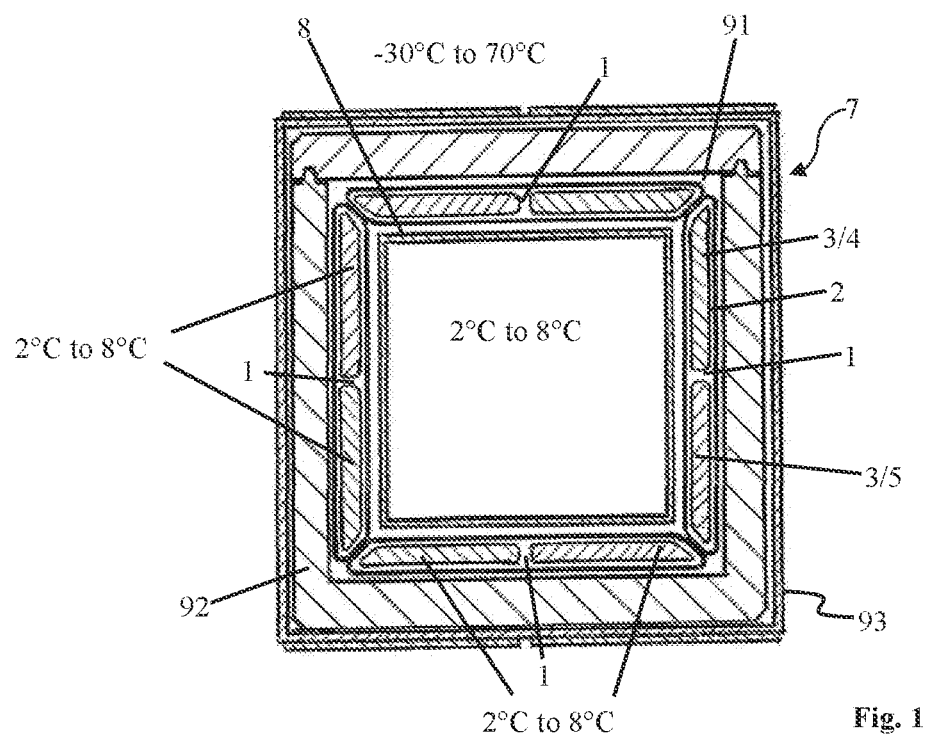

The schematic drawings show some more details and advantages of the invention. Especially the thermo-cell, according to the invention, and the transport-box, according to the invention, (FIGS. 1 and 2) are described with more details. In FIGS. 3, 4 and 5 the state of the art is shown as described above. It shows:

FIG. 1: An example of design of a transport-box, according to the invention, with a thermo-cell, according to the invention FIG. 2: A diagram of the course of the heat flow of the pcm measured with differential scanning calorimetry FIG. 3: a first form of design of a transport-box of the state of the art FIG. 4: a second form of design of a transport-box of the state of the art FIG. 5: a third form of design of a transport-box of the state of the art

WAV(S) OF INVENTION EXECUTION

Certain terms are used in the following description for practical reasons and are not restrictive. The terms "right", "left", "bottom" and "top" are directions in the drawing. The terms "to the inside", "to the outside", "below", "above", "left", "right" or similar are used for the description of the arrangement of individual parts, the movement of individual parts and the directions to or from the geometric center of the invention as well as individual parts shown in the drawings. E.g. if a part of the drawing is turned around, elements and characteristics which are described as "below" are "above" afterwards. The terminology contains the terms mentioned above as well as derivations and synonyms.

FIG. 1 shows a cold-transport box 7 as a form of design of a transport-box, according to the invention. The cold-transport box 7 includes an internal space 6 of approx. 8 liters which is surrounded by a cell wall 91 to take in a temperature-sensitive good. One side of the cell wall 91 is equipped with a protective layer 8 which restricts the internal space 6. The internal space 6 has a square cross section with an even, horizontal bottom wall, vertical side walls and a horizontal lid wall. The pharmaceutical can be placed on the bottom wall of the internal space 6.

The cell wall 91 is equipped with several thermo-cells 1 which are arranged around the internal space 6. At every side, bottom or lid wall, a thermo-cell borders to the internal space 6. The thermo-cells 1 contain each a cell body 2 in which two filling chambers 3 are arranged. The filling chambers 3 are flatly side by side so that both borders the corresponding wall of the internal space 6. Both of the filling chambers 3 of each thermo-cell 1 contains a first and a second filling chamber 3. The first filling chamber 3 is filled with a first pcm 4 which changes its phase at a temperature of approx. 2 degrees Celsius. The second filling chamber 3 is filled with a second pcm 5 which changes its phase at a temperature of approx. 8 degrees Celsius. The first and the second pcm 4, 5 change phases between solid and liquid at a temperature of 2 degrees Celsius and 8 degrees Celsius, respectively.

To the outside, the cell wall 91 is surrounded by a insulation 92. That way the thermo-cells 1 are wrapped up in the insulation 92 and consequently they are protected from short-termed variations of temperature and from irradiation. The isolation 92 shows a transport-box bottom and a transport-box lid. The transport-box lid of the insulation 92 can be lifted and consequently the inner part can be made accessible. To the outside the transport-box 1 is finished by an outside wall 93. The outside wall 93 contains every part of the transport-box 1. It can be opened from the top. The outside wall 93 can be made of cardboard or corrugated cardboard.

The internal space 6 can be held at a temperature from 2 to 8 degrees Celsius through the first and the second filling chambers 3 respectively the pcm 4, 5 inside the filling chambers 3. The pharmaceuticals which are positioned in the internal space 6 can be ensured during their transport.

If the coldness below 2 degrees Celsius penetrates the insulation 92, the first pcm 4 in the first filling chambers 3 change their phase from liquid to solid. That way the internal space 6 stays protected from the coldness irradiation. The first pcm4 works as a coldness barrier.

If the warmness above 8 degrees Celsius penetrates the insulation 92, the second pcm 5 in the second filling chambers 3 change their phase from solid to liquid. That way a relatively adequate quantity of warmness can be absorbed and the internal space 6 stays protected from the warmness irradiation. The second pcm 5 works as a warmness barrier.

Figure 2:
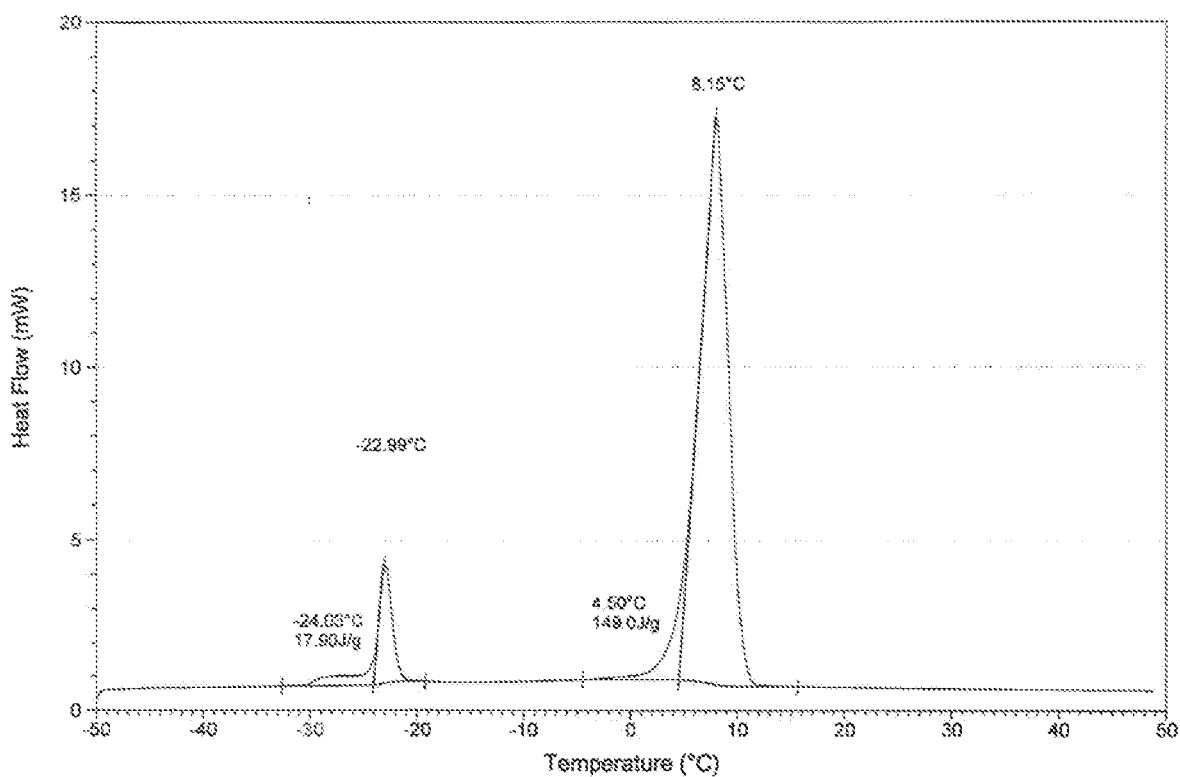

FIG. 2 shows exemplarily how the heat flow runs through the second pcm 5 of the thermo-cell 1. It is obvious that from −50 degrees Celsius to +50 degrees Celsius there is an almost constant heat flow of approx. 1 mW. At the temperature of −24 degrees Celsius there is a deflection to approx.

4 mW. Approx. 18 J/g can be taken in during this deflection. A second, bigger deflection is shown at a temperature of approx. 8 degrees Celsius at which point the second pcm 5 changes its phase from solid to liquid. Approx. 150 J/g of the second pcm 5 can be taken in during this deflection. With this kind of analysis, respectively like in the measurement of FIG. 2, pcm which fulfill exactly the demanded conditions can be identified. Especially the material shown in FIG. 2 is useful as a temperature harrier for the temperature of 8 degrees Celsius.

Although the invention is described by means of the figures and their description, this portrayal is an illustrative example and should not restrict the extent the invention. To not transfigure the invention, some structures and techniques are not shown in detail. Needless to say that experts can make changes or variations without exceeding the extent of the invention. The invention covers furthermore embodiments with a variety of combinations of characteristics which can differ from the described characteristics. E.g. the invention can be realised like the following:

The first and the second pcm can be filled into a common filling chamber. This can simplify the construction of the thermo-cells. But it is important that the two pcm do not damage respectively influence each other.

The transport-boxes on pallets or with air or shipment container can be equipped with an opening at the side instead of a lid.

This disclosure contains a variety of forms of design with any combinations of characteristics. It contains also individual characteristics in the figure even when they are shown with different kind of characteristics which are named. The alternatives from the form of design which are shown in the figures and the descriptions can be excluded. The disclosure contains forms of design which contain exclusively characteristics named in the claims respectively in the examples of design as well as some kind of forms which contain different characteristics.

The term "contain" and its derivations does not exclude other elements or further steps. The term "a" does not exclude a variety of it. The functions of some characteristics which are mentioned in the claims can be fulfilled by a unit respectively a step. The term "approximately" and similar in connection with a quality respectively a result defines exactly the quality respectively exactly the result. The term "approximately" in connection with a value can refer to a quality or an area which lies within 20%, within 10%, within 5% or within 2% of the given value. Every reference sign in the claims are meant as a restriction to the extent of the invention.

The invention claimed is:

1. A transport box for the transport of a temperature-sensitive good in a temperature range between a lower temperature in a range of 1.6 to 2.4 degrees Celsius and an upper temperature in a range of 6.4 to 9.6 degrees Celsius, comprising:
    an internal space to receive the temperature-sensitive good, and
    a cell wall, which surrounds the internal space, wherein the cell wall comprises a bottom wall, side walls and a lid walls, wherein
    at least one thereto-protection-storage-cell for ensuring a temperature range from the lower temperature to the upper temperature is arranged in the cell wall adjacent to each one of the bottom wall, the side walls and the lid wall, wherein
    each of the at least one thereto-protection-storage cells includes a cell body and two filling chambers which are arranged in the cell body,
    the two filling chambers of each of the at least one thermo-protection-storage cells are arranged flatly side by side, such that the two filling chambers abut at the respective one of the bottom, side and lid walls of the internal space,
    one of the two filling chambers of each of the at least one thermo-protection-storage cells is filled with a first phase-change material which changes its phase at the lower temperature, and
    one of the two filling chambers of each of the at least one thermo-protection-storage cells is filled with a second phase-change material which changes its phase at the upper temperature.

2. The transport-box of claim 1, which comprises an insulation, wherein the insulation covers the at least one thereto-protection-storage-cell.

3. A method comprising a step of transporting a pharmaceutical medicament in a transport-box according to claim 1.

4. A method comprising a step of transporting a human or an animal organ in a transport-box according to claim 1.

5. The transport box of claim 1, wherein the first phase-change material changes its phase between solid and liquid at the lower temperature.

6. The transport box of claim 1, wherein the second phase-change material changes its phase between solid and liquid at the upper temperature.

* * * * *